(12) United States Patent
Kitajima et al.

(10) Patent No.: US 7,660,576 B2
(45) Date of Patent: Feb. 9, 2010

(54) PORTABLE INFORMATION TERMINAL AND INFORMATION TRANSMITTING METHOD

(75) Inventors: Hidetoshi Kitajima, Takahagi (JP); Seishi Hanaoka, Kodaira (JP); Minoru Ikeda, Inagi (JP); Koji Suzuki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 223 days.

(21) Appl. No.: 11/322,341

(22) Filed: Jan. 3, 2006

(65) Prior Publication Data

US 2006/0111139 A1    May 25, 2006

Related U.S. Application Data

(63) Continuation of application No. 10/183,347, filed on Jun. 28, 2002, now Pat. No. 6,996,423.

(30) Foreign Application Priority Data

Jan. 23, 2002    (JP)    ............... 2002-013653

(51) Int. Cl.
    *H04M 1/725*    (2006.01)
(52) U.S. Cl. ............... 455/412.1; 455/418; 455/456.1; 455/415; 455/550.1; 455/566
(58) Field of Classification Search .............. 455/412.1, 455/412.2, 418, 456.1, 415, 550.1, 566, 557
    See application file for complete search history.

(56) References Cited

U.S. PATENT DOCUMENTS 5,128,981 A * 7/1992 Tsukamoto et al. ......... 455/450
6,704,608 B1    3/2004 Azuma
6,996,423 B2 * 2/2006 Kitajima et al. ............. 455/566
7,212,827 B1 * 5/2007 Veschl ...................... 455/456.1
7,242,951 B2 * 7/2007 Helferich .................... 455/458
7,266,186 B1 * 9/2007 Henderson ............. 379/142.04

FOREIGN PATENT DOCUMENTS

| CN | 1321281 A | 11/2001 |
| JP | 7-236179 A | 9/1995 |
| JP | 8-272831 | 10/1996 |
| JP | 11-085641 | 3/1999 |
| JP | 2000-137774 | 5/2000 |
| JP | 2000-285059 A | 10/2000 |
| JP | 2001-197567 | 7/2001 |
| JP | 2002-009974 | 1/2002 |

OTHER PUBLICATIONS

Chinese Office Action issued in Chinese Patent Application No. CN 200610095868X dated Nov. 6, 2009.

* cited by examiner

*Primary Examiner*—Sanh D Phu
(74) *Attorney, Agent, or Firm*—McDermott Will & Emery LLP

(57) ABSTRACT

The disclosed invention provides a portable information terminal making it possible to easily transmit a plurality of kinds of information. The portable information terminal allows its user to select information categories to transmit from items stored as personal and/or schedule information in its memory. The selected categories are associated with one of data class of business use, private use, and the like. When the user selects the name and instructs the terminal to transmit, the terminal reads the information belonging to selected categories of the data class from the memory and transmits them, according to the specified transmission distance or destinations.

4 Claims, 19 Drawing Sheets

FIG.2

| Field | Value |
|---|---|
| Name: | |
| Pron.Characters: | |
| Sex: | |
| Address 1: | |
| Address 2: | |
| Address 3: | |
| Tel. Number: | XX-XXXX-XXXX |
| E-mail Address: | XXX@hitachi.co.jp |
| Office Where the Person Works: | |
| Office's Tel. Number: | |
| Office's Fax Number: | |
| Birthday of the Person: | |
| Remark: | |

[ OK ]  [ Cancel ]

FIG.13

Do You Agree to Transmit Selected Data?

| OK | Cancel |

FIG.15

| Name | Pron. | Sex | Address 1 | Address 2 | Address 3 | Tel. Number | E-mail Address |
|---|---|---|---|---|---|---|---|
| Hitachi Taro | hitachi-taro | Male | Tokyo-to | Chiyoda-ku | | XX-XXXX-XXXX | XXX@hitachi.co.jp |
| Hitachi Hanako | hitachi-hanako | Female | Ibaragi-ken | Hitachi-shi | | XX-XXXX-XXXX | YYY@hitachi.co.jp |
| ⋮ | ⋮ | ⋮ | ⋮ | ⋮ | ⋮ | ⋮ | ⋮ |

| Office | Office's Tel. Number: | Office's Fax Number: | Birthday |
|---|---|---|---|
| Hitachi, Ltd. | XX-XXXX-XXXX | XX-XXXX-XXXX | 1968.11.09 |
| Hitachi, Ltd. | XX-XXXX-XXXX | XX-XXXX-XXXX | 1970.11.16 |
| ⋮ | ⋮ | ⋮ | ⋮ |

FIG.16

| File | Size | Attribute | Date of Creation | Repository |
|---|---|---|---|---|
| Briefing A | 100 | | 01/12/17 | ¥My Document |
| Briefing B | 200 | | 01/12/16 | ¥My Document¥Briefing |
| Briefing C | 300 | | 01/12/10 | ¥My Document¥Briefing |
| Photo 1 | 1000 | R | 01/12/24 | ¥My Document¥Photo |
| Photo 2 | 1200 | R | 01/12/24 | ¥My Document¥Photo |
| ⋮ | ⋮ | ⋮ | ⋮ | ⋮ |

FIG.17

| Title of Scheduled Item | Place | It will Start on | Start at | Terminate on | Terminate at |
|---|---|---|---|---|---|
| Meeting A | Meeting Room No.1 | 01/12/25 | 09:00 | 01/12/25 | 10:00 |
| Meeting B | Meeting Room No.3 | 01/12/25 | 15:00 | 01/12/25 | 16:15 |
| Get-together C | Dinning Room | 01/12/26 | 18:00 | 01/12/26 | 20:00 |
| Morning Gathering | Hall | 01/12/27 | 08:30 | 01/12/27 | 09:00 |
| ⋮ | ⋮ | ⋮ | ⋮ | ⋮ | ⋮ |

FIG.19

Data Received.
Do You Want Data Stored?

| OK | Cancel |

PORTABLE INFORMATION TERMINAL AND INFORMATION TRANSMITTING METHOD

RELATED APPLICATIONS

This application is a Continuation application of Ser. No. 10/183,347, filed Jun. 28, 2002 now U.S. Pat. No. 6,996,423, which claims priority of Japanese Patent application No. 2002-013653, filed Jan. 23, 2002, and the contents of which are herewith incorporated by reference.

BACKGROUND OF THE INVENTION

The present invention relates to portable information terminals capable of transmitting and receiving information, such as personal digital assistants (PDA) and cellular phones, and an information transmitting method.

Such a PDA with a business card exchange function is known that transmits user-entered business card information stored on it to another person's portable information terminal, using infrared frequencies. In addition, such a cellular phone is known that can transmit personal information about someone else or the phone user, or a schedule stored in the telephone directory of the phone to another cellular phone.

JP-A-137774/2000 disclosed an IC card characterized in that the information categories to transmit can alter according to the distance from the transmitting terminal to the receiving terminal device as the transmitter approaches the receiver.

When transmitting personal information to another person's terminal, using the above-described portable information terminals, it is desirable to alter the information specifics to transmit, according to the situation such as business or private contacts or how close the caller is to the called person or party.

However, the above-described PDA and cellular phone simply transmits the personal information stored in its memory to another terminal and does not allow for alteration of information categories according to the destination. Thus, if the user inputted not only office and home telephone numbers and e-mail addresses but also his or her birthday and blood type to the terminal, the terminal transmits all these information stored in its memory to the specified destination when it connects to another terminal, whoever the recipient is. The above-described portable information terminals do not allow the user to easily alter the information specifics to be transmitted, according to the situation or the destination and a problem was posed that they have limitations in usability.

The IC card described in JP-A-137774/2000 has two memories and the memory to access changes, according to the distance from the transmitter to the receiver, thereby changing the information specifics to transmit. Thus, by applying this method to a portable information terminal and storing different kinds of information into different memories of the terminal, the information specifics to transmit can be altered by the distance of transmission. However, a problem of this method is that the number of memories must be increased as the number of kinds of information to transmit increases.

SUMMARY OF THE INVENTION

The object of the present invention is to provide a portable information terminal and information transmitting method making it possible to easily transmit a plurality of kinds of information.

In order to solve the above-described problems and according to one implementation of the present invention, a portable information terminal is provided. The portable information terminal allows its user to select categories for transmitting from the which have information stored as personal and/or schedule information in memory. The selected categories are associated with data class, like one of level designators of business use, private use, and the like, and stored. When the user selects the data class and instructs the terminal to transmit, the terminal reads information corresponding to items, which belongs to selected name from the memory and transmits information, according to the specified transmission distance or destinations.

BRIEF DESCRIPTION OF THE DRAWINGS

These and other features, objects, and advantages of the present invention will become more apparent from the following description when taken in conjunction with the accompanying drawings wherein:

FIG. 2 illustrates an exemplary entry window of user personal information;

FIG. 13 illustrates an example of displaying a confirmation prompt asking if the user agrees to transmit;

FIG. 15 illustrates an exemplary personal information database;

FIG. 16 illustrates an exemplary file management database;

FIG. 17 illustrates an exemplary database for schedule data;

FIG. 19 illustrates an example of displaying a storing data confirmation prompt.

DETAILED DESCRIPTION OF THE PREFERRED EMBODIMENTS

A preferred embodiment of the present invention in which the invention is applied to a portable information terminal such as a personal digital assistant (PDA) or a cellular phone will now be described with reference to the accompanying drawings.

Figure 1:
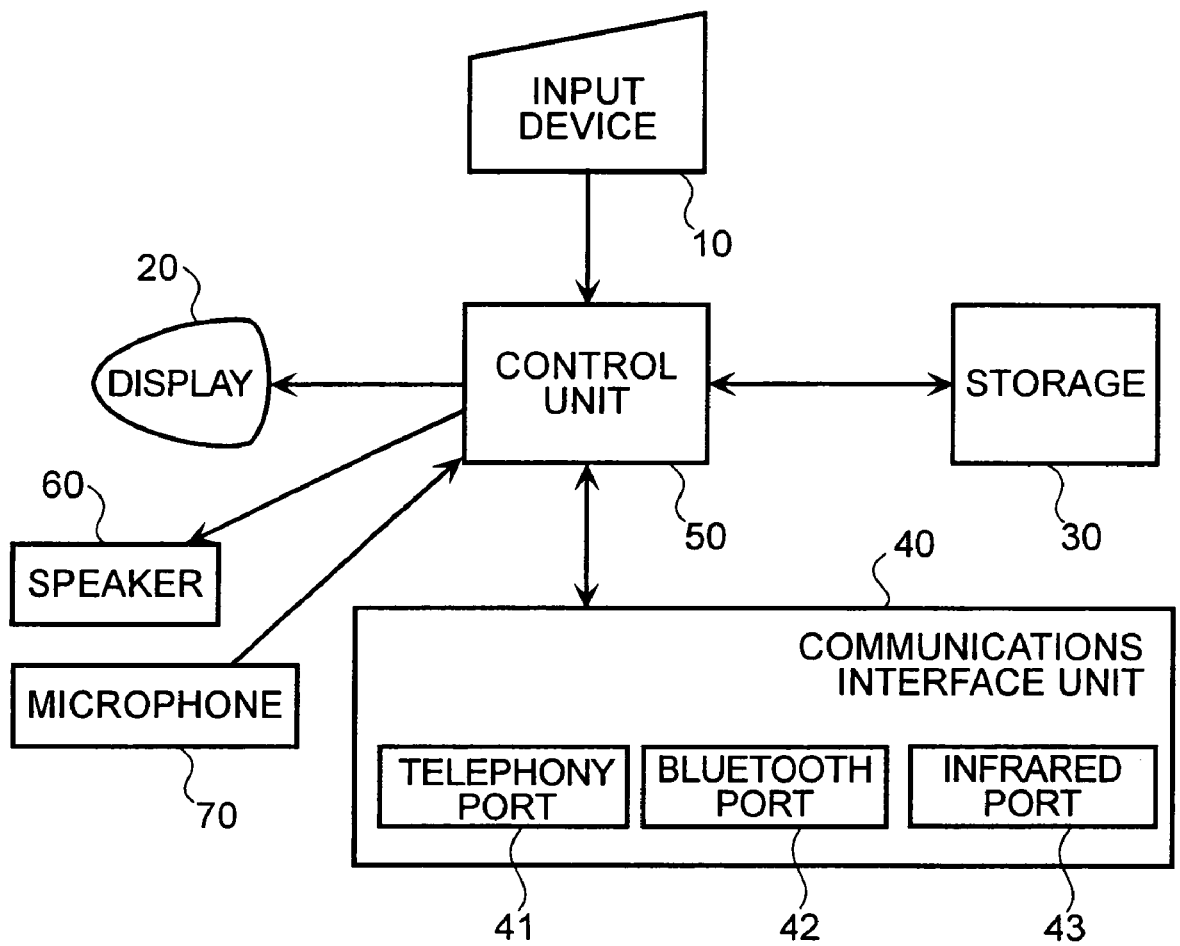
FIG. 1 is a functional block diagram of a portable information terminal according to a preferred embodiment of the present invention.

FIG. 1 is a functional block diagram of the portable information terminal according to the present preferred embodiment. In FIG. 1, reference numeral 10 denotes an input device through which the user of the terminal inputs informational data like personal information, and instructs the terminal to start/terminate communication, change operation mode, and do other actions. Input device is referred to as category selecting means, category selector, data class selecting means, data class selector, distance selecting means, and distance selector. Reference numeral 20 denotes a display which displays personal information, text, and other information. Reference numeral 30 denotes a storage device storing personal information such as telephone numbers and addresses, and text, image, program, and other data. The storage device 30 is referred to as memory unit, and memory means. The storage device 30 is comprised at least 1 memory, more than 2 memories are available to comprise storage device 30. Reference numeral 40 denotes a communications interface unit that is equipped with a telephony port 41 for transmitting and receiving speech data and e-mail over telephone circuits, a Bluetooth port 42 for transmitting and receiving data without using the telephone circuits ("Bluetooth" is a trademark), and an infrared port 43. Communications interface unit 40 is referred to as transmitting means, transmitter, power adjust means, and power adjustor. Reference numeral 50 denotes a control unit which connects to the components such as the input device 10 and the communications interface unit 40 and performs control operations. Control unit 40 is referred to as entering means, entering device, reading means, and reading device. Reference numeral 60 denotes a speaker generating voice output and 70 denotes a microphone which captures and inputs voice. Following the instructions of a program stored in the storage device 30, the control unit 50 controls the procedures that will be explained below.

First, a procedure of inputting and storing user personal information to the portable information terminal will be explained.

When personal information data entry mode is selected through the input device 10, the control unit 50 directs the display 20 to open a data entry window 200 which is illustrated in FIG. 2. The data entry window 200 has entry fields 201 for entering items comprising, for example, a person's name, pronunciation characters, sex, addresses, telephone number, e-mail address, the name, telephone number, and fax number of the office where the person works, birthday of the person. The left side information like name, pronunciation characters, and so on are referred to as category. The user fills in all or some of the fields 201, using the input device 10. After inputting informational data into the fields 201, when the user chooses the OK button 202, the inputted information is written into the storage device 30. By choosing the Cancel button 203, the storing of inputted information is canceled. The telephone number and e-mail address of the portable information terminal may set in advance in their fields 201 without being inputted by the user through the input device 10. By setting them in advance in their fields, it becomes unnecessary for the user to check the telephone number and the like of the terminal and input it, and usability can be improved.

For personal information about someone else, the user inputs the information on the same entry window opened, using the input device 20, and the information can be stored.

The following will explain a procedure of selecting personal information for transmitting from the personal information associating items stored in the method described above, associated with the selected items with name (refers to as data class), like one of level designators of business use, private use, and the like, according to the situation of transmission and the destination.

Figure 3:
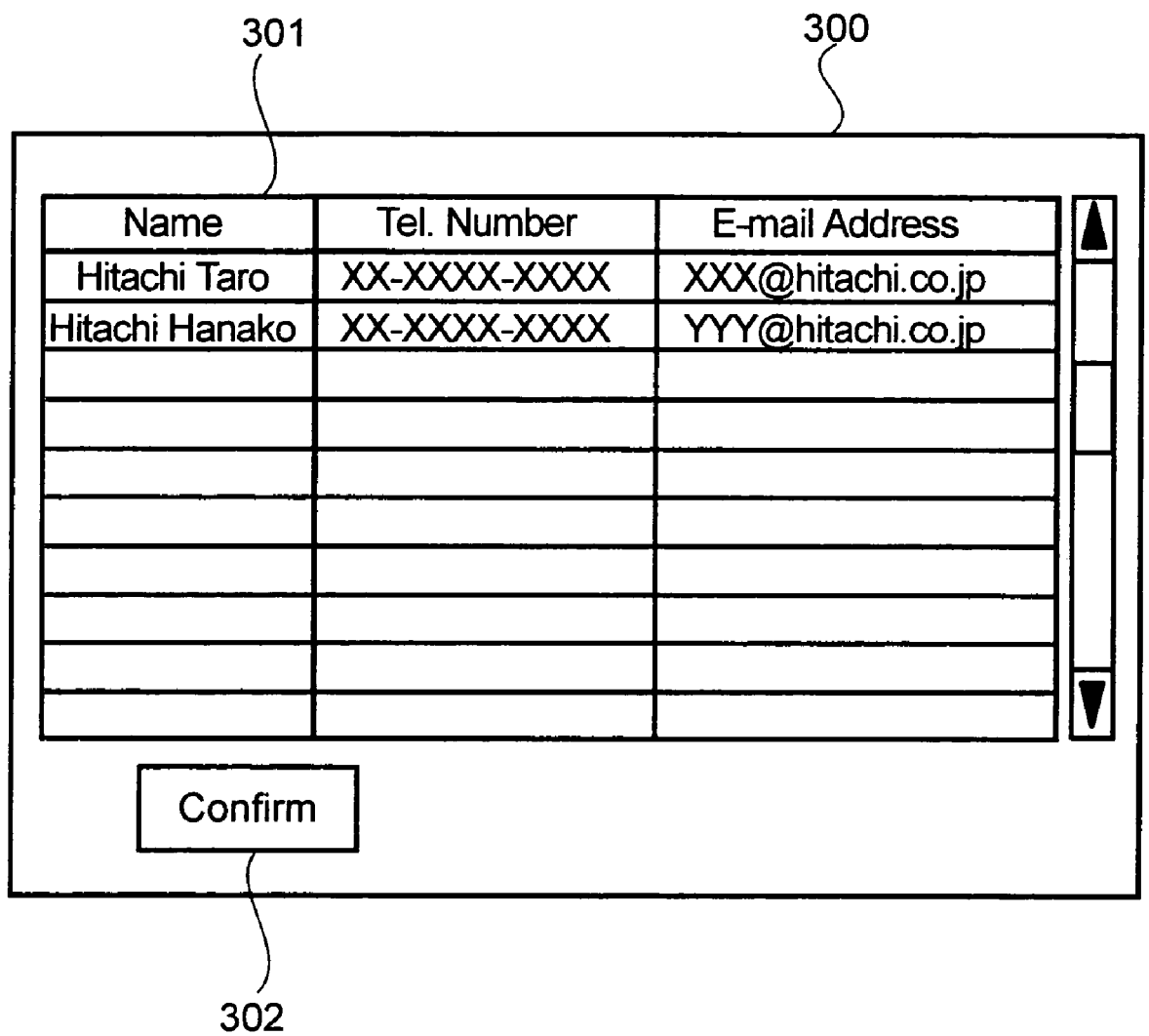
FIG. 3 illustrates an exemplary personal information list window.

FIG. 3 illustrates a personal information list window 300 opened on the display 200. From the list 301 that indicates the stored information for a plurality of persons, the user selects any one, for example, the user's name. While the list 301 contains the name, telephone number, and e-mail address entries, the list may be made in other forms; for example, listing names only if the display screen of the portable information terminal is small.

Figure 4:
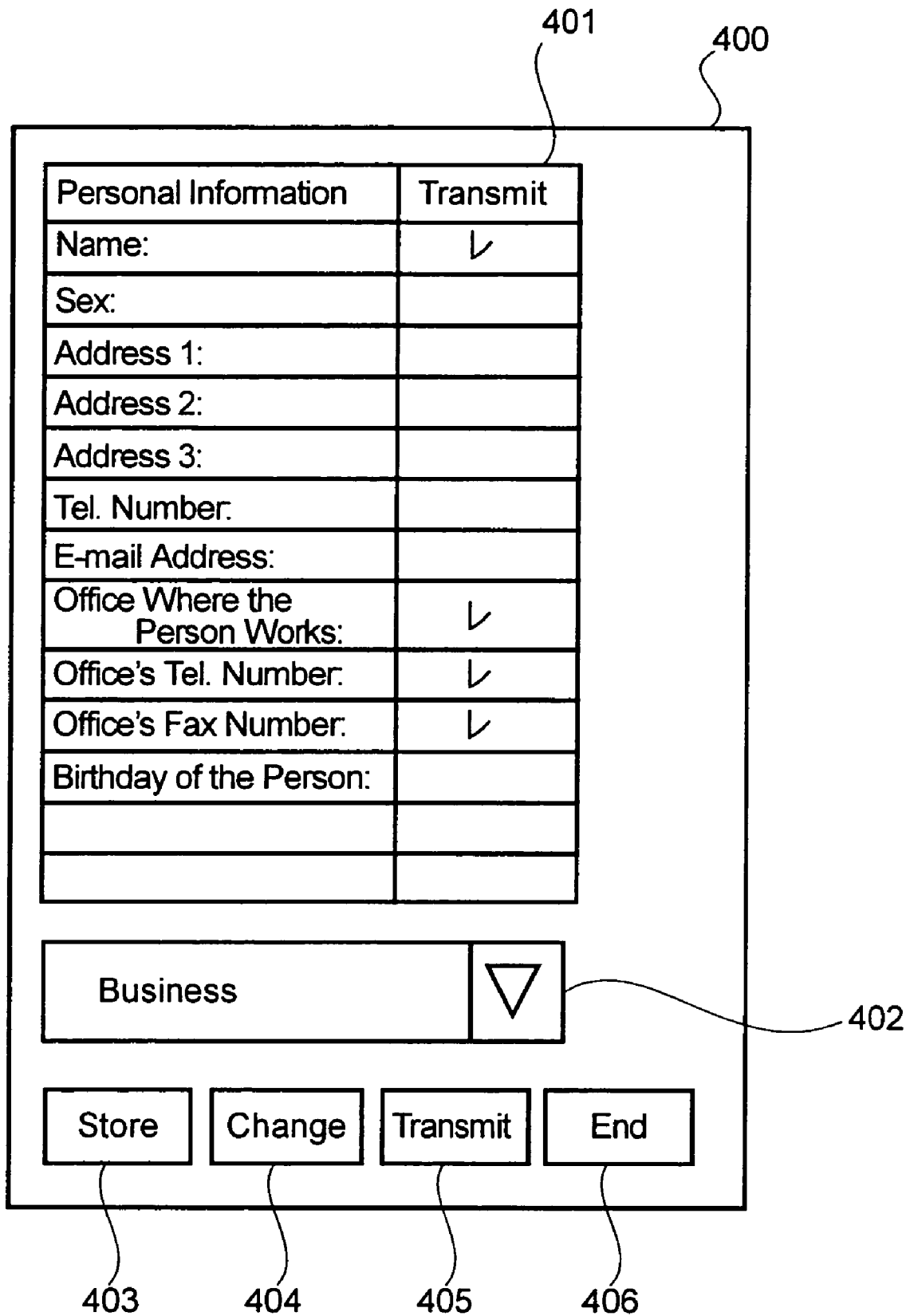
FIG. 4 illustrates an exemplary selection window allowing the user to select information items to transmit.
Figure 5:
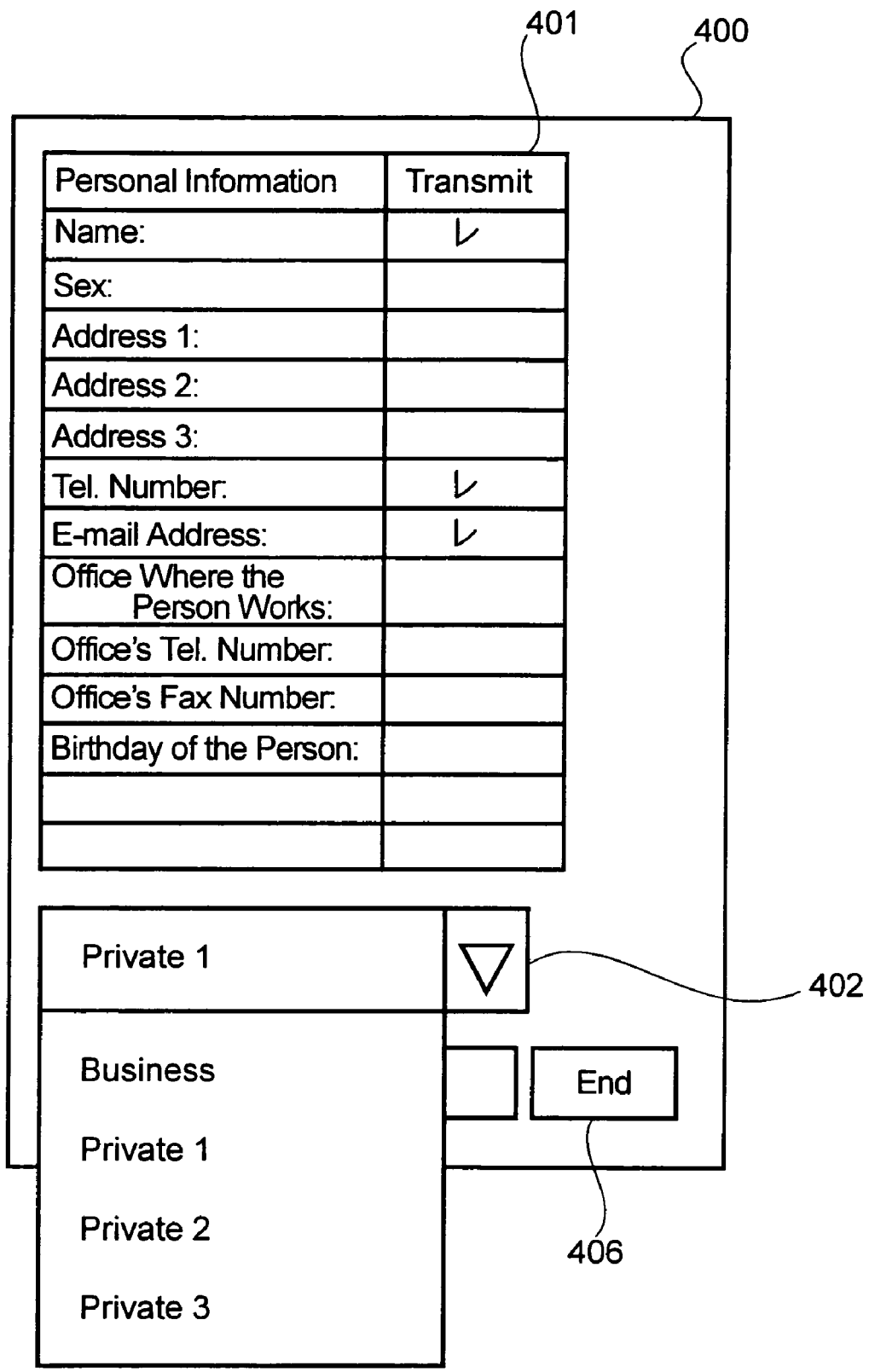
FIG. 5 illustrates another exemplary selection window allowing the user to select information items to transmit.

When the user confirms the selection and chooses the Confirm button 302, a selection window 400 which is illustrated in FIG. 4 opens on the display 20. Using the input device 10, the user selects information items that the user wants to transmit from the list 401. By pulling down the selector of an input level pop-up menu 402 as is illustrated in FIG. 5, the user selects name, like one of the level designators of private use, business use, and the like. The thus selected items are stored together as one group of data to transmit, tagged with a name. According to the illustrative selection shown in FIG. 4, name, office where the person works, office's telephone number, and fax are selected as data to transmit for business use. After selecting the items to transmit with an information level, when the user chooses the Store button 403, the selected items associated with name are stored into the storage device 30.

If the user is going to have data to transmit for private use stored in the storage device 30, following having the data to transmit for business use stored, the user selects, for example, "Private 1" by pulling down the selector of the information level pop-up menu 402 illustrated in FIG. 5. The user should select items to transmit, as is the case when having the data to transmit for business use stored.

When changing the items once stored as the data to transmit for business use or private use, select the level of the data to transmit to which user wants to change by pulling down the selector of the information level pop-up menu 402. Add one or more items to transmit or delete one or more items from the items to transmit as user desire, check the selections, and choose the Store button 403, then the newly selected items with level are stored into the storage device 30. In the present preferred embodiment, unless choosing the Transmit button 405 or End button 406, the user can continue the operation of selecting a new level and data to transmit or changing the data to transmit.

In present preferred embodiment, items are selected from the items having inputted personal information and stored as the data of a certain level to transmit as explained above. Thus, it is not necessary to enter personal information whenever the transmission situation and destination change. A plurality of patterns of data to transmit can easily be stored in the memory of a single portable information terminal and better usability is provided.

If different sets of information specifics to transmit should be prepared for different recipients, but most information specifics such as personal information are common, storing all sets of information specifics for different destinations into the storage device 30 results in ineffective use of memory space. Instead of storing all sets of information specifics redundantly into the storage device 30, by storing the user-inputted information items, name of private use, business use, and the like, and the selected items tagged with a name into the storage device 30, the memory space to be occupied can be reduced. The items are not data contents such as name, sex, and address. They are numbers as identifiers (ID) assigned to each item for management. Accordingly, a plurality of combinations of name and item ID number will be stored into the storage device 30. The name can be replaced by ID numbers for management if they are predefined.

If all sets of data to transmit are discretely stored, when one item of information has changed (for example, the telephone number has changed), the corresponding items in all data sets to transmit must be changed. In contrast, in the present preferred embodiment, personal information is not altered and inputted again to accommodate different transmission situation; instead, information to transmit are selected from the first entered personal information items. Therefore, even if an item of personal information has changed when a plurality of patterns of data to transmit has been stored, it is only necessarily to choose the information item entered on the personal information entry window. Easy information management can be implemented.

By using the pull-down selector of the information level pop-up menu 402 as in the present preferred embodiment, the user can easily select name like an information level. However, this menu with the pull-down selection is not restrictive and the user may input a name through the input device 10. This direct manner allows the user to arbitrarily specify a level designator suitable for circumstances of use that may differ for each user.

According to the above-described preferred embodiment, the user input personal information to have the information written into the memory of the portable information terminal and selects data to transmit. This embodiment may be modified such that, on behalf of the user, an operator center registers data of personal information as specified by the user and transfers the registered data to the terminal; eventually, the data is stored on the terminal, then the user selects data to transmit, according to the level. Because portable information terminals are more miniaturized to enhance portability with the input device such as the character input keys being very small, characters may be hard to input as compared with personal computers. In the present preferred embodiment, to accommodate different transmission situation, it is not necessary to input altered personal information again, and instead, the user simply selects items for transmitting from the items as stored personal information as described above. Accordingly, even if the user is unfamiliar with handling the portable information terminal, the user can take other means for storing personal information instead of inputting it by the user, and eventually the personal information to transmit can easily be altered, according to situation.

Storing data of personal information is embodied in such a way that, for example, the user calls the operator center and tells the operator personal information, and then the information is received by the operator or a voice recognition mechanism. The received information is stored in a data form that can be transferred into the personal information database on the portable information terminal. Then, the personal information is transferred by e-mail as a data file attached to the e-mail to the user's portable information terminal. On the portable information terminal that received this e-mail, the attached data file is opened by user instructions and the data is stored into the memory. In this case, the user is charged the fees for filing and transferring the data of personal information.

Alternatively, the user accesses the Web site home page of the operator center, information on the rendered personal information receiving page, requests the site to download the information to the user's terminal, and eventually, the information is stored into the memory. Alternatively, the user visits the local service center or the like, tells the receptionist personal information that the user wants to have the terminal stored, and the service center input the information into data that is transferred to the user's information terminal and eventually stored therein.

While inputting or registering and storing personal information as the data to transmit as explained in the above-described preferred embodiment, it should be understood that the embodiment is applicable to inputting or registering and storing schedule or image data as the data to transmit.

Figure 6:
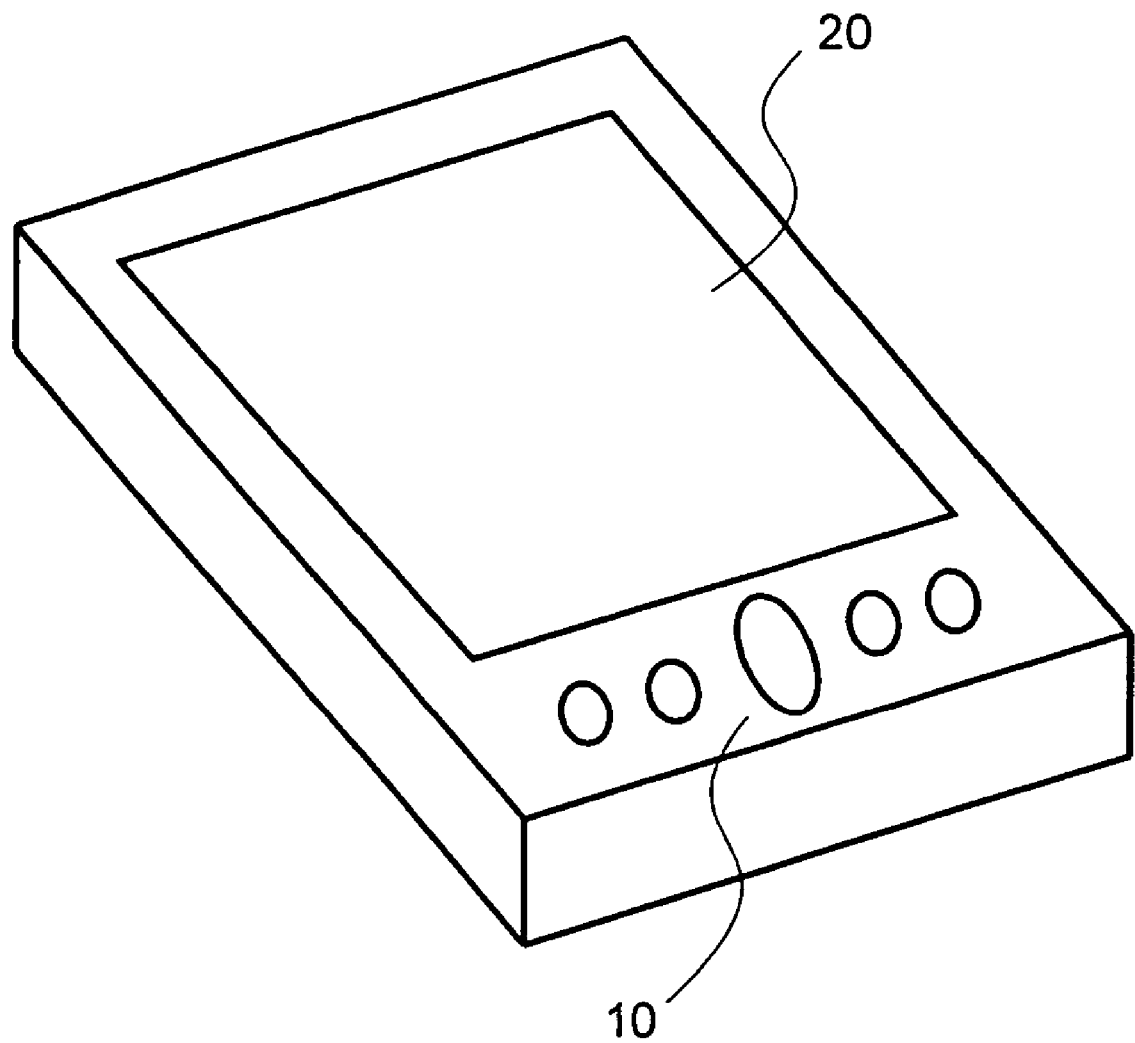
FIG. 6 represents the configuration of an exemplary PDA.
Figure 7:
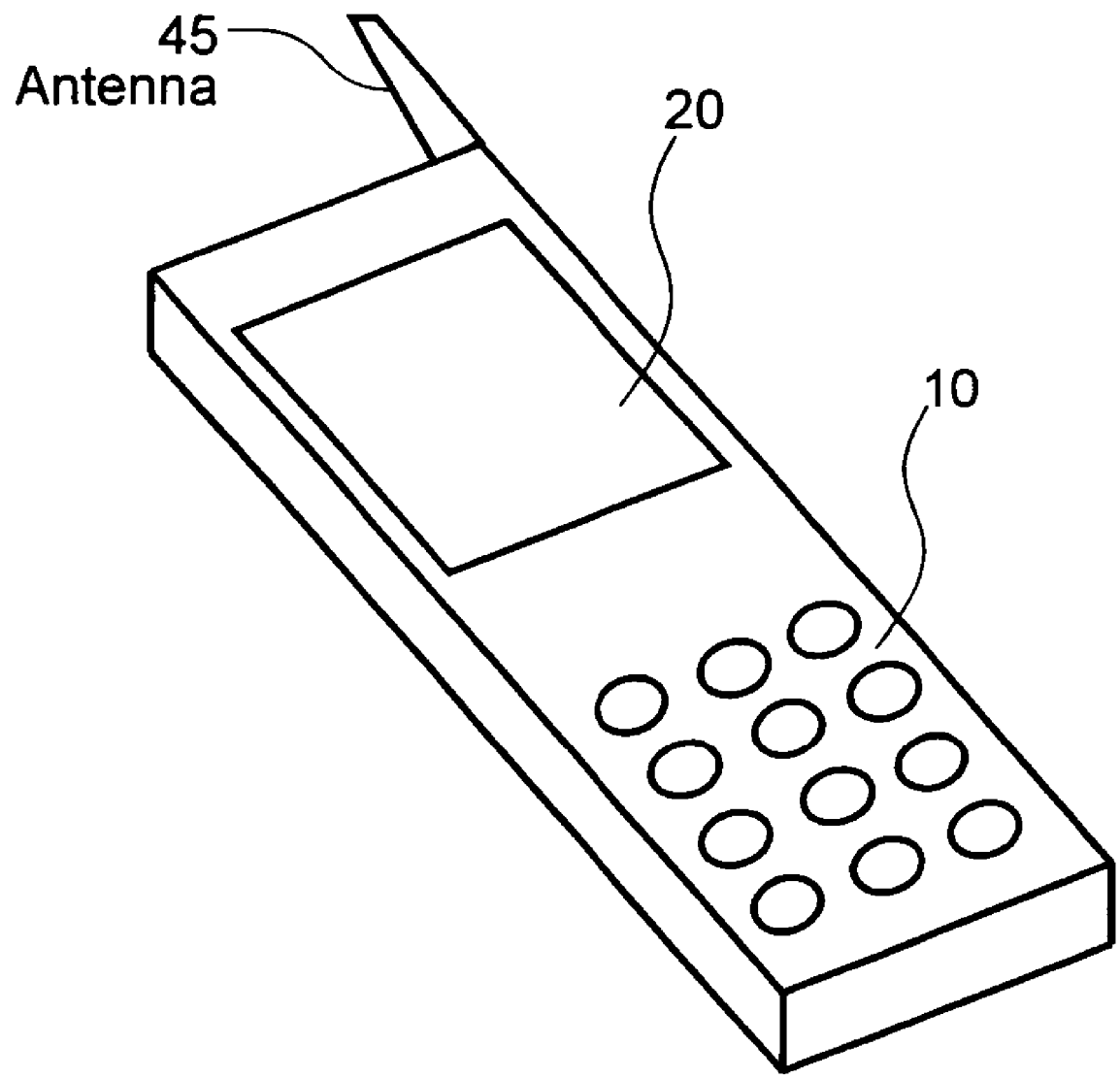
FIG. 7 represents the configuration of an exemplary cellular phone.

Inputting personal information and selecting its items are performed through the input device 10 as explained above. Although the configuration of the input device 10 is not described in detail, the input device is not limited to a keyboard consisting of numeric and character keys and a cross button to move the cursor. A touch-panel display 20 may be employed so that the user will enter information by touching the display 20 with his or her finger or a pen or equivalent. If the portable information terminal is a PDA with a relatively large display, which is exemplified in FIG. 6, the touch-panel display is preferably used so that the user can enter characters or the like easily, which results in enhanced usability. If the portable information terminal is a cellular phone with a smaller display, which is exemplified in FIG. 7, key operation is preferable to touching the display panel in that selection errors can be prevented.

Procedures of transmitting the stored data to transmit will now be explained. In the following, an illustrative case where data is transmitted to another portable information terminal such as a cellular phone will be explained. However, it is, of course, possible to transmit data to other devices such as a personal computer.

Figure 8:
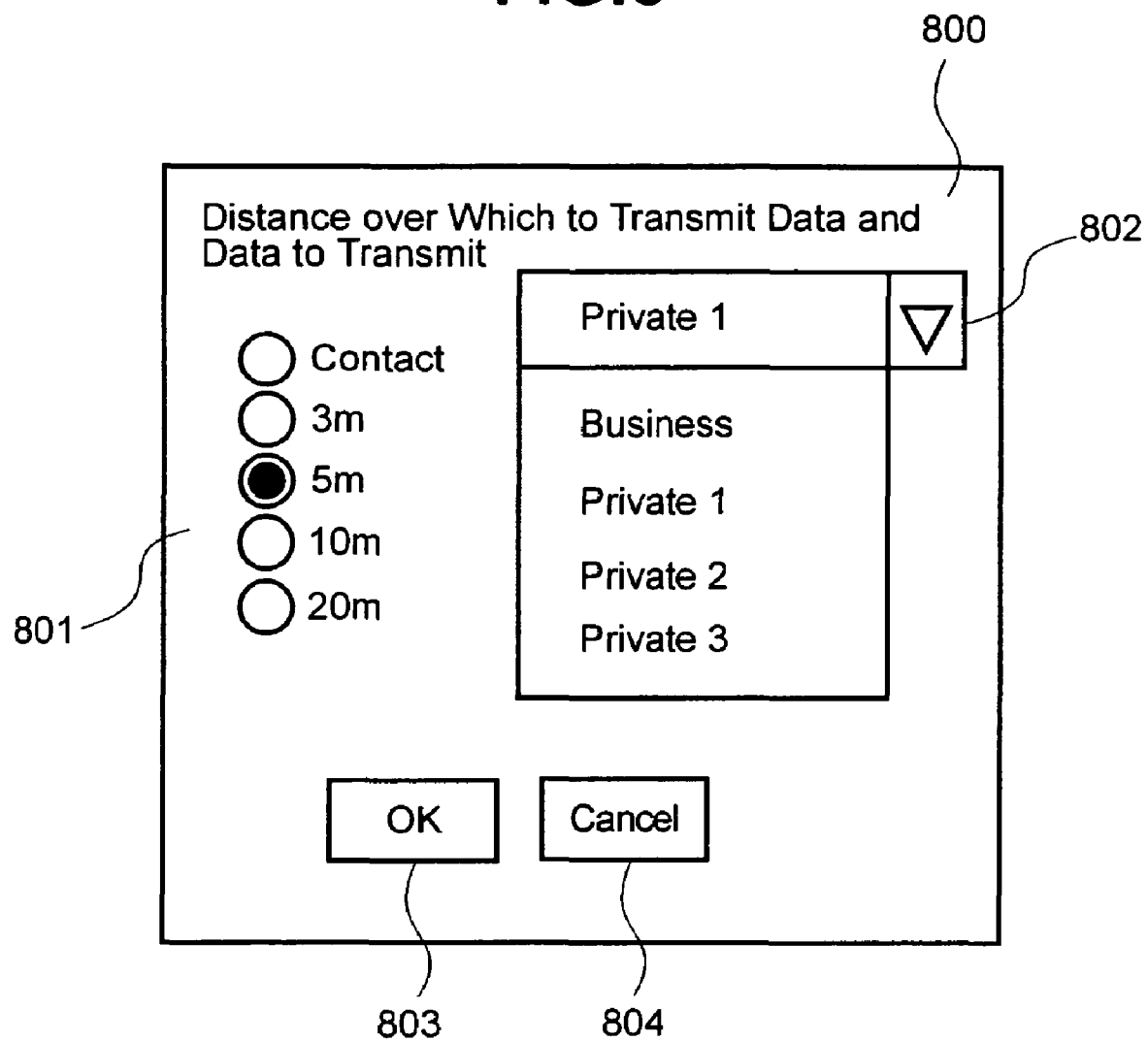
FIG. 8 illustrates an exemplary window allowing the user to specify distance over which data is transmitted and data to transmit.

A first transmission procedure using the Bluetooth port 42, wherein information is transmitted and the information transmitting output is adjustable for distance, will now be explained. When the user changes the mode to transmission mode and selects the first transmission mode through the input device 10, a window allowing the user to specify distance and data to transmit, which is illustrated in FIG. 8, opens. Reference numeral 801 denotes distance selector buttons allowing the user to specify a distance over which data can be transmitted. When the user selects one of the buttons, the distance over which information is transmitted can be specified. Reference numeral 802 denotes a data selector allowing the user to specify data to transmit. Reference numeral 803 denotes the OK button to save the specified settings and 804 denotes the Cancel button to cancel the specified settings. Distance label "20 m" indicates that the transmitting output is set so that information can be transmitted to any portable information terminal existing within the range of 20 meters from the transmitting terminal. "Contact" indicates that the transmitting output is set so that information can be transmitted to another portable information terminal being in contact with the transmitting terminal.

The distance selector buttons 801 provided as above so that the transmitting power is variable are useful. For example, when a meeting is held in a room, briefing data is distributed to its members from the terminal and disclosure of the data outside the meeting room can be prevented. According to this preferred embodiment, besides the information transmission within a particular room such as a meeting room, it is possible to multicast the data to some of the people being within the room at a time. Because an access point is not required, unlike communication over a LAN, it is also possible to multicast information to the members of a specific group in outside environments. While multicasting information to a plurality of people, using the Bluetooth port 42 is embodied in this embodiment; other non-directional communication methods may be used.

Unless it is necessary to multicast information to a plurality of people, for example, when you want to transfer information by "contact" or transmit information in a specific direction, directional communication means such as the infrared port 43 may be used. By transmitting and receiving information, using the Bluetooth 42 or infrared port 43 other than the telephony port 41, information can be transmitted without the cost of communication.

Figure 9:
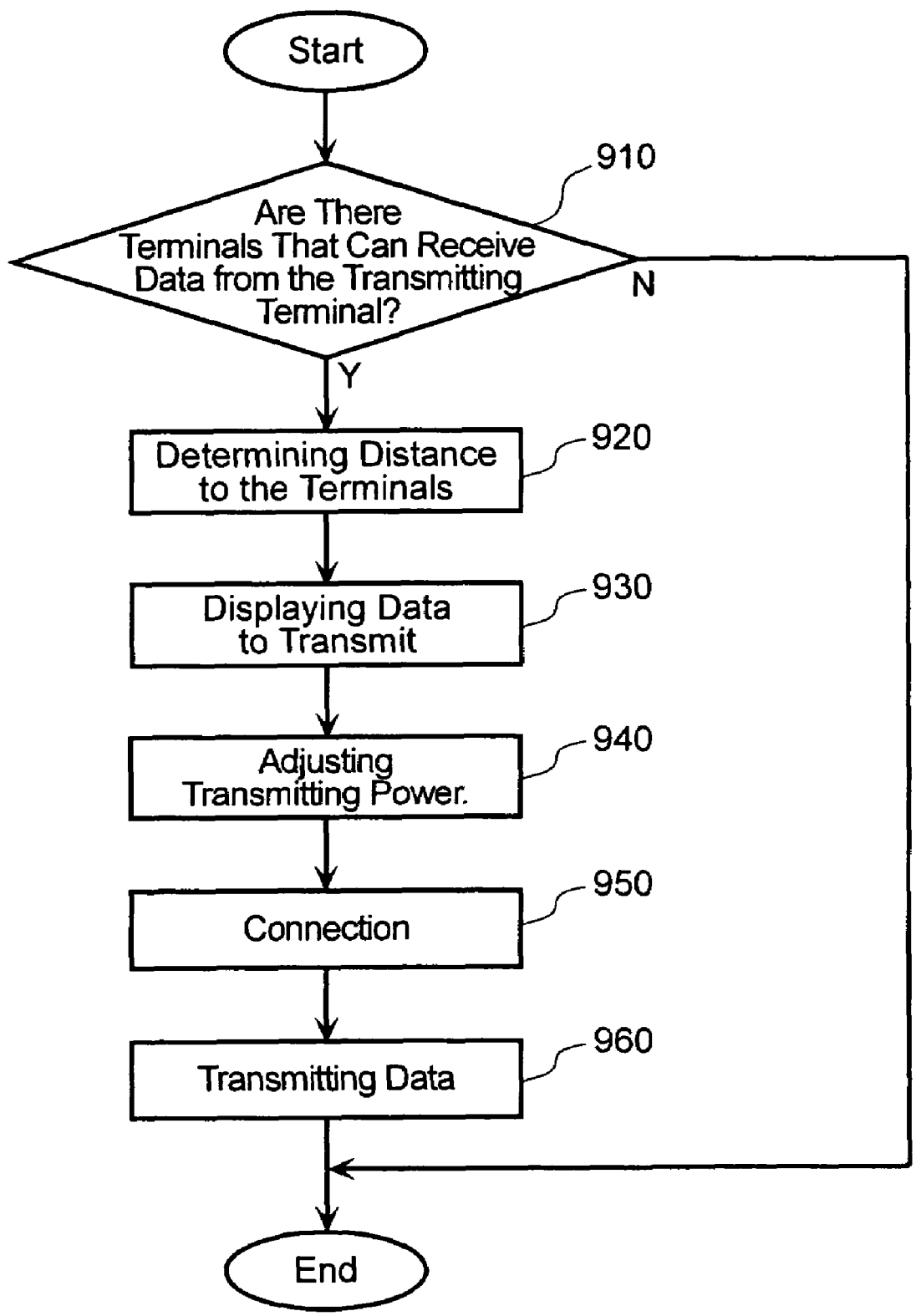
FIG. 9 is an exemplary flowchart illustrating the steps of a transmission process in which information to transmit alters according to distance.

It is also preferable to set combinations of distance over which to transmit data and data to transmit so that the data to transmit automatically will alter, based on the settings. For example, transmission is controlled as follows. To portable information terminals existing within a radius of 10 m from the transmitting terminal, information tagged with private 1 that contains only the names is transmitted. To terminals existing within a radius of 5 m from the transmitting terminal, information tagged with private 2 is transmitted. When another portable terminal is brought in contact with the transmitting terminal, information tagged with private 3 is transferred to it. FIG. 9 is a flowchart illustrating the steps of this transmission process. First, the transmitting terminal checks whether there are terminals to which data can be transmitted around it (step 910). If there are none of such terminals, the terminal terminates the transmission process. If there are such terminals, the terminal determines distance to the terminals (step 920). The terminal display data to transmit, according to the determined distance (step 930). When the user agrees to transmit the data, the terminal adjusts the transmitting power (step 940). The terminal connects to a path of RF communication through the Bluetooth port 42 or infrared port 43 (step 950) and transmits the data (960). According to this preferred embodiment, simply by adjusting the distance to the destination portable information terminal, the information to transmit can automatically alter. Because information items are tagged with one of the levels beforehand and stored, as described in the present preferred embodiment, the information to transmit can be altered, according to the distance even if the terminal has a single memory.

Figure 10:
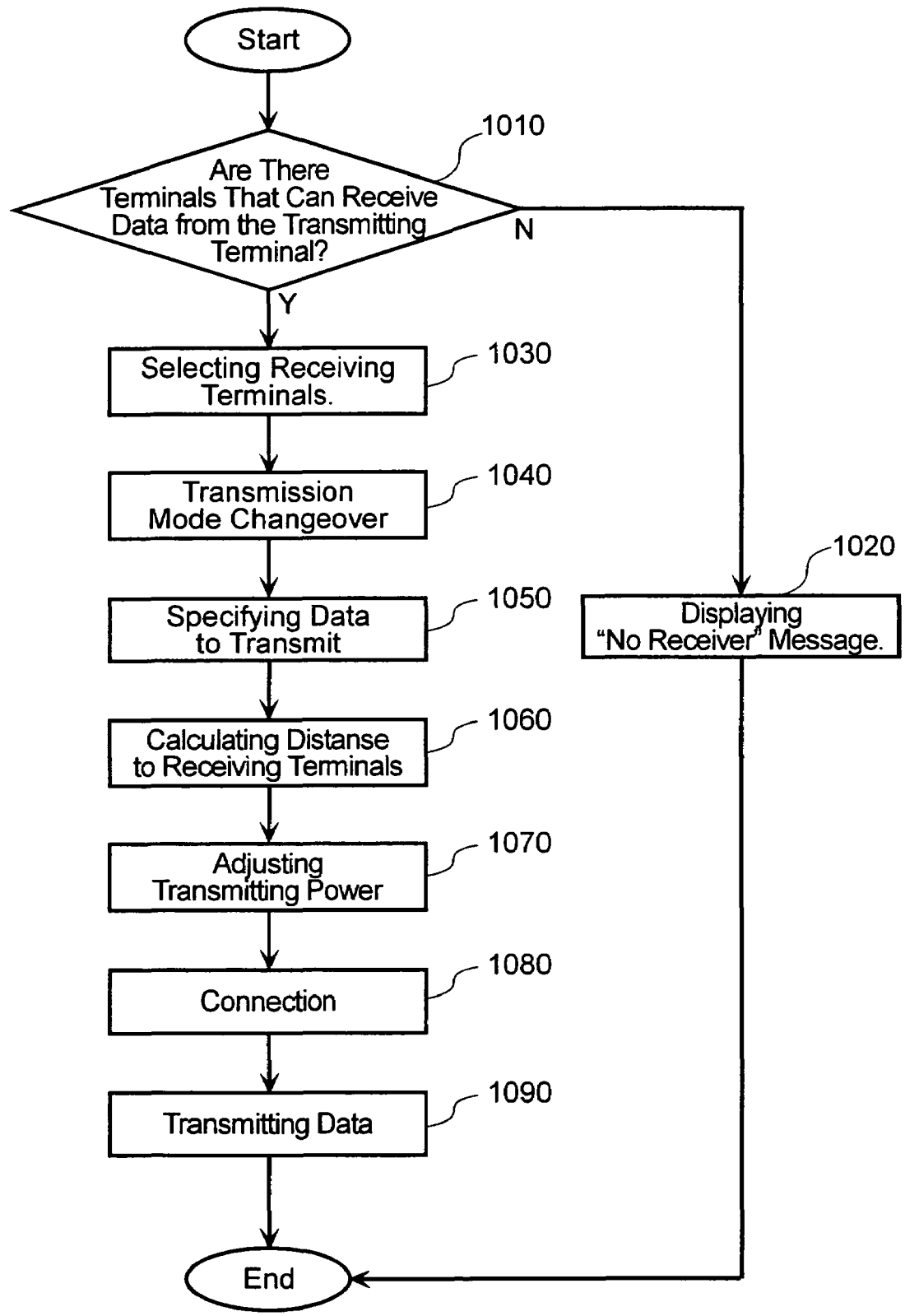
FIG. 10 is an exemplary flowchart illustrating the steps of a transmission process in which receiving terminals are specified and data is transmitted to them.

Then, a second transmission procedure wherein destinations (receiving terminals) are specified and information is transmitted to them will be explained. FIG. 10 is a flowchart illustrating the steps of the process in which receiving terminals are specified and data is transmitted to them.

Figure 11:
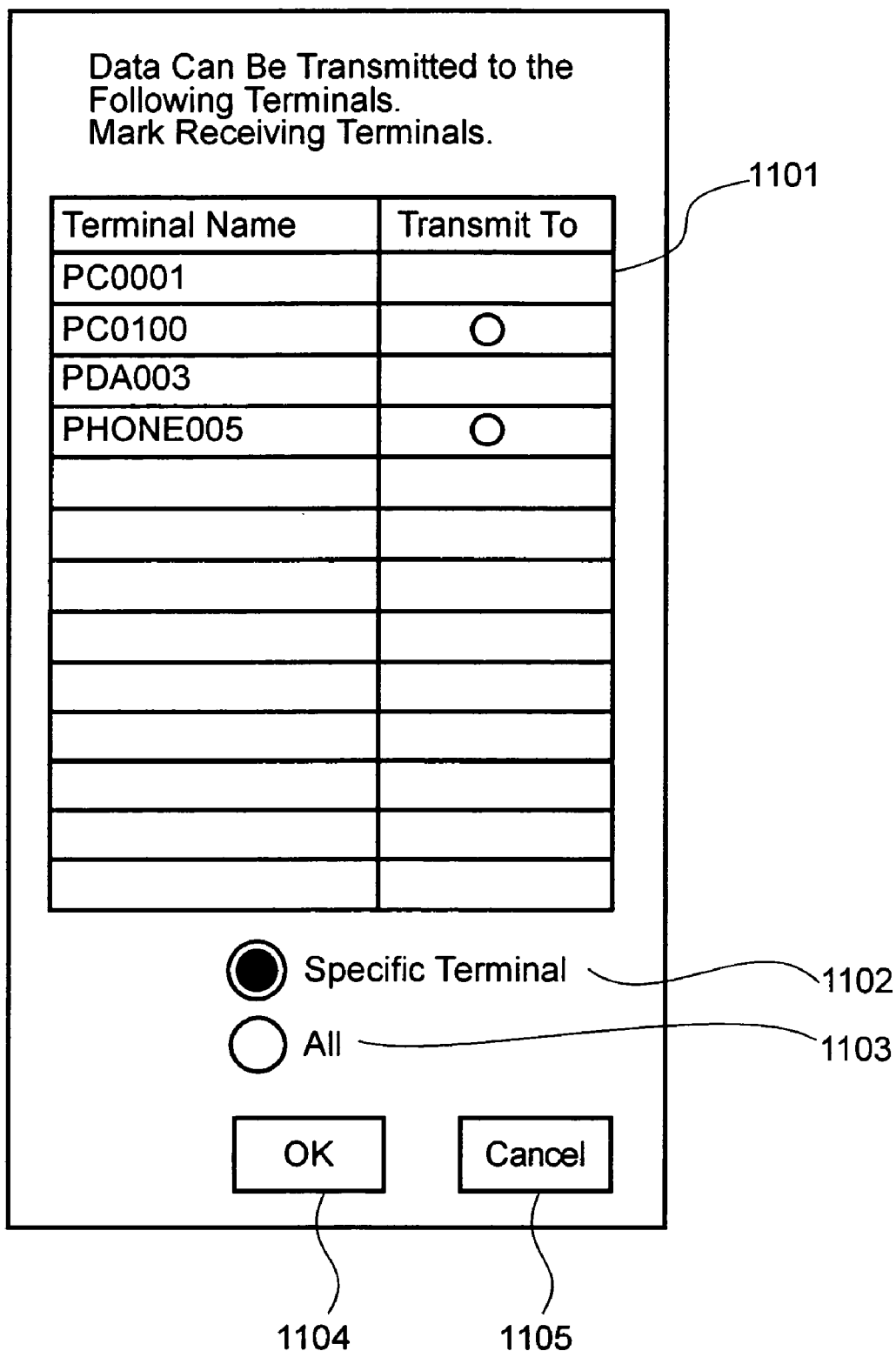
FIG. 11 illustrates an exemplary list window allowing the user to specify terminals to which data is transmitted.
Figure 12:
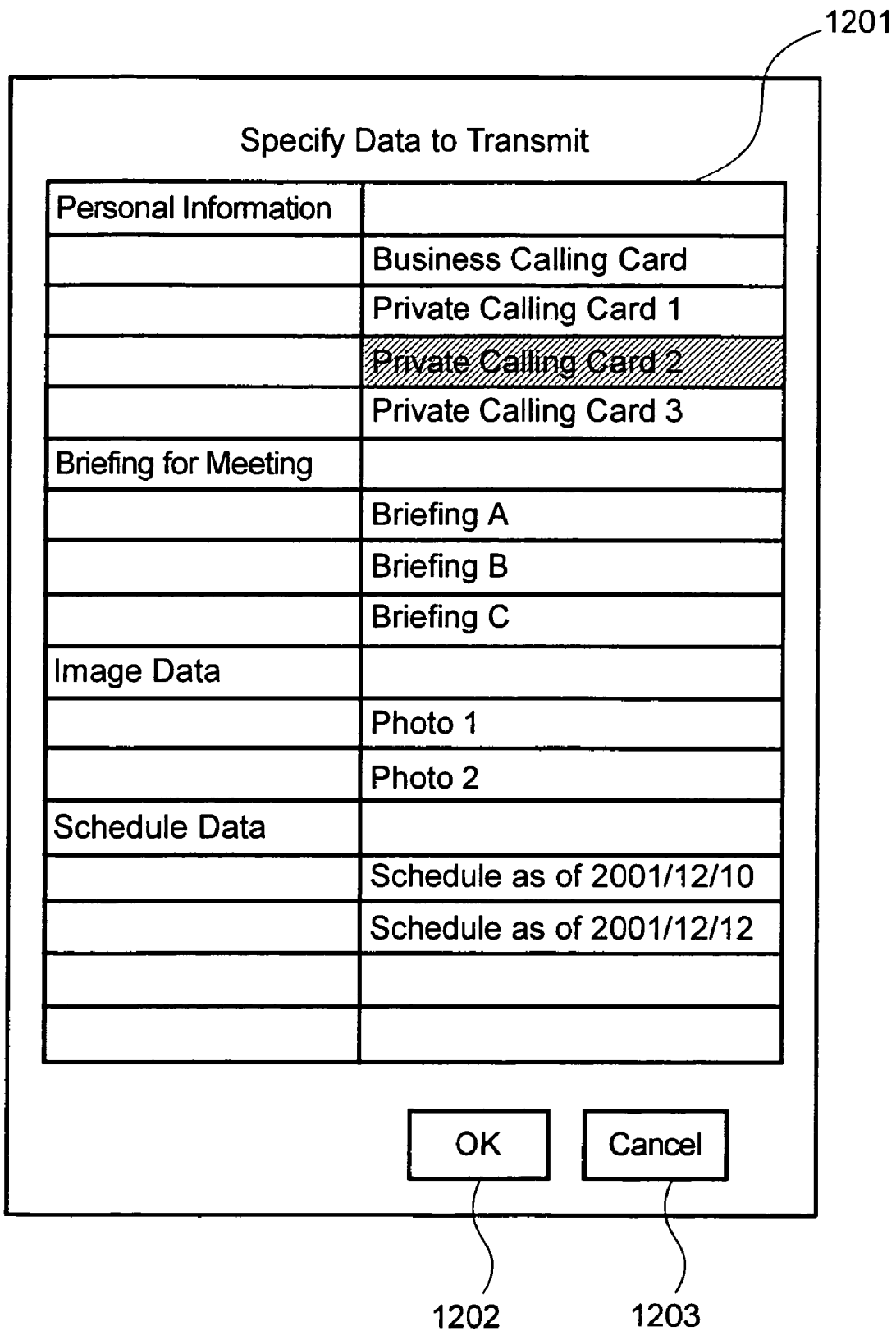
FIG. 12 illustrates an exemplary window allowing the user to specify data to transmit.

When the user changes the mode to transmission mode and selects second transmission mode through the input device 10, the process starts and the transmitting terminal checks whether there are terminals to which data can be transmitted around it (step 1010). If there are none of such terminals, the terminal terminates the data transmission process, displaying a message such as "no receiver found" indicating that there are no terminals to which data can be transmitted (step 1020). If there are such terminals, the terminal displays a list 1011 of destinations to which data can be transmitted (step 1030); the list is illustrated in FIG. 11. Using data receiving terminals selector buttons 1102 and 1103 shown in FIG. 11, the user specifies whether to transmit information to some (specific terminals marked) of the terminals to which data can be transmitted or all terminals listed. Based on the user-specified destinations, port changeover occurs if necessary to transmit through the Bluetooth port 42 when transmitting to all terminals or the infrared port 43 when transmitting to specific receiving terminals (step 1040). Then, the terminal displays a list of data 1201 that can be transmitted on a window allowing the user to specify data to transmit (1050); the window is illustrated in FIG. 12. When the user specify the name, or data to transmit and chooses the OK button 1202, the distance to the terminals selected as the receiving terminals is calculated by an infrared sensor or the like (step 1060) and the terminal adjusts the transmitting power (step 1070). The terminal connects to a path of RF communication with the receiving terminals (step 1080). The terminal transmits the specified data to the specified terminals (step 1090).

In the second transmission procedure, destinations are selected and then data is transmitted, and therefore, reliable transmission can be performed even if briefing including top secret information is transmitted. For example, transmission can be performed in such a way as to transmit briefing A to all members of a meeting and briefing B to some of the members. After the user selects receiving terminals and data to transmit, to prevent erroneous transmission, it is preferable to display a user confirmation prompt as is illustrated in FIG. 13 so that the terminal will transmit the data if the user agrees to transmit. Moreover, the confirmation prompt preferably includes the receiving terminals and the data items to transmit. By displaying this prompt, even if the receiving terminals and the data to transmit selected by the user are incorrect, the user can become aware of the error and erroneous transmission can be prevented.

In the second transmission procedure, the Bluetooth port 42 and the infrared port 43 are used to transmit data, and therefore, it is not necessary to install a special device as is the case in the first transmission procedure and data transmission can be performed freely. While the terminal of the present preferred embodiment is equipped with both the Bluetooth port 42 and the infrared port 43, the terminal may be equipped with either the Bluetooth port 42 or the infrared port 43. For example, if the user mostly communicates with some specific people, the terminal may be equipped with the infrared port only. If the user intends to perform data transmission for easily exchanging business cards with a great number of people, the terminal may be equipped with the Bluetooth port only. Not only the Bluetooth port and infrared port, other directional and non-directional ports and communication methods may be used, of course, if capable of communicating information.

Figure 14:
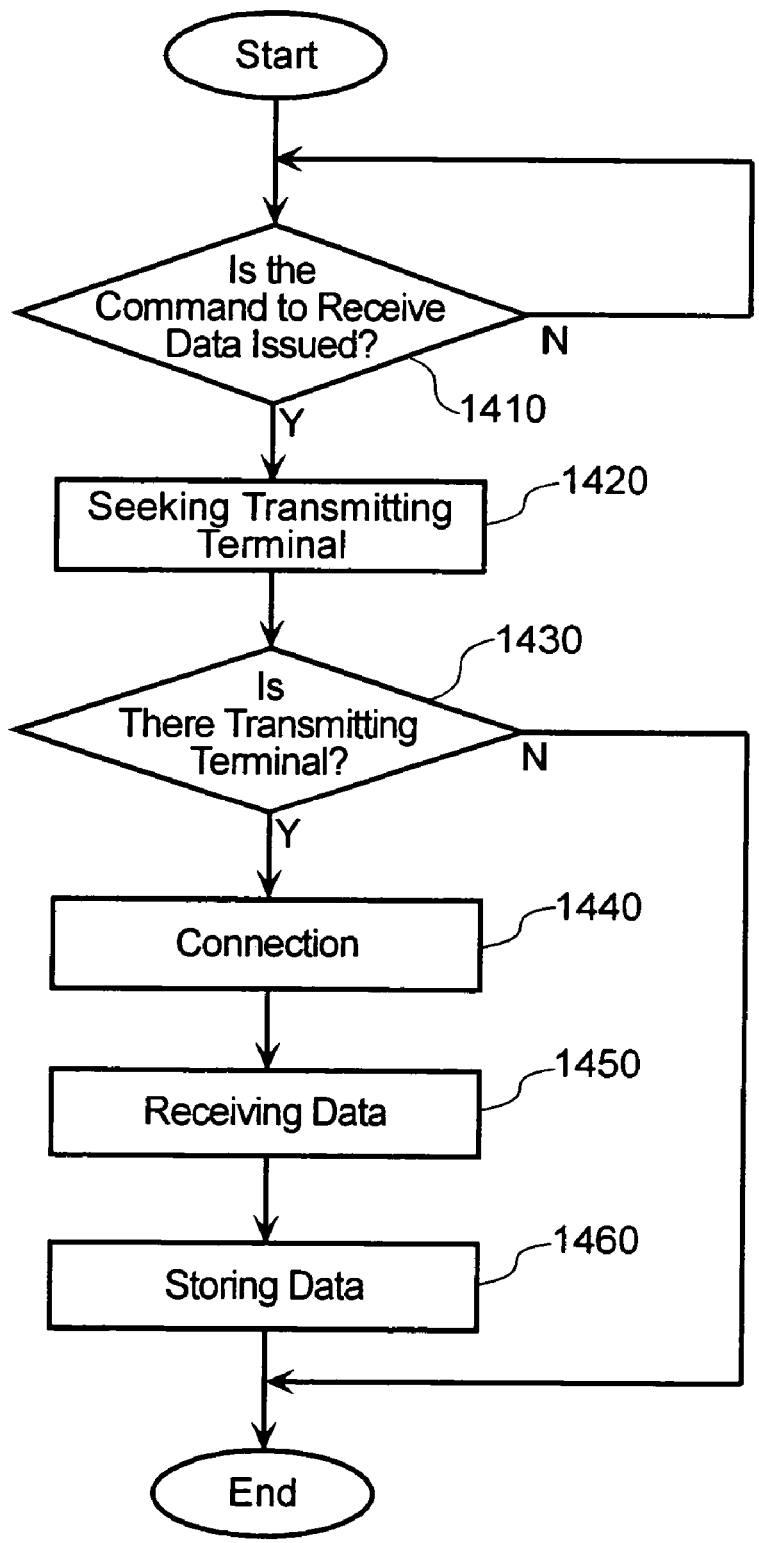
FIG. 14 is a flowchart illustrating the steps of a data receiving process.

The steps of the process of receiving data transmitted by the above-described first or second transmission procedure will now be explained, using FIG. 14. First, the control unit 50 of the receiving terminal checks whether the command to receive data is issued from the user (step 1410). When the command is issued, the receiving terminal seeks the transmitting terminal (step 1420). If the transmitting terminal exists, the control unit 50 makes the receiving terminal connect to the transmitting terminal (step 1440) and receive data through the communications interface unit 40 (step 1450).

During the above reception, it is also preferable that the control unit 50 makes the display 20 displays a prompt message such as, for example, "ΔΔ arrived from OO. Do you receive it?" and the terminal receives data only when the user agrees to receive. Because arrived data may include the data that the user does not want to receive, by displaying this prompt, unwanted data reception can be prevented.

A step 1406 in which the received data such as personal information and briefing for a meeting is stored into the memory of the receiving portable information terminal will be explained below. Received personal information is stored into the personal information database (FIG. 15) retained in the storage device 30. The database has the fields corresponding to the items of personal information. Received files such as briefing and image data are stored into the file management database on the information terminal; the structure of the database is exemplified in FIG. 16. The database has the exemplary fields of file name, size, attribute such as read only, date of creation, and repository. FIG. 17 illustrates the exemplary database structure for schedule data, having the title of scheduled item, place, starting date, starting time, terminating date, and terminating time.

Figure 18:
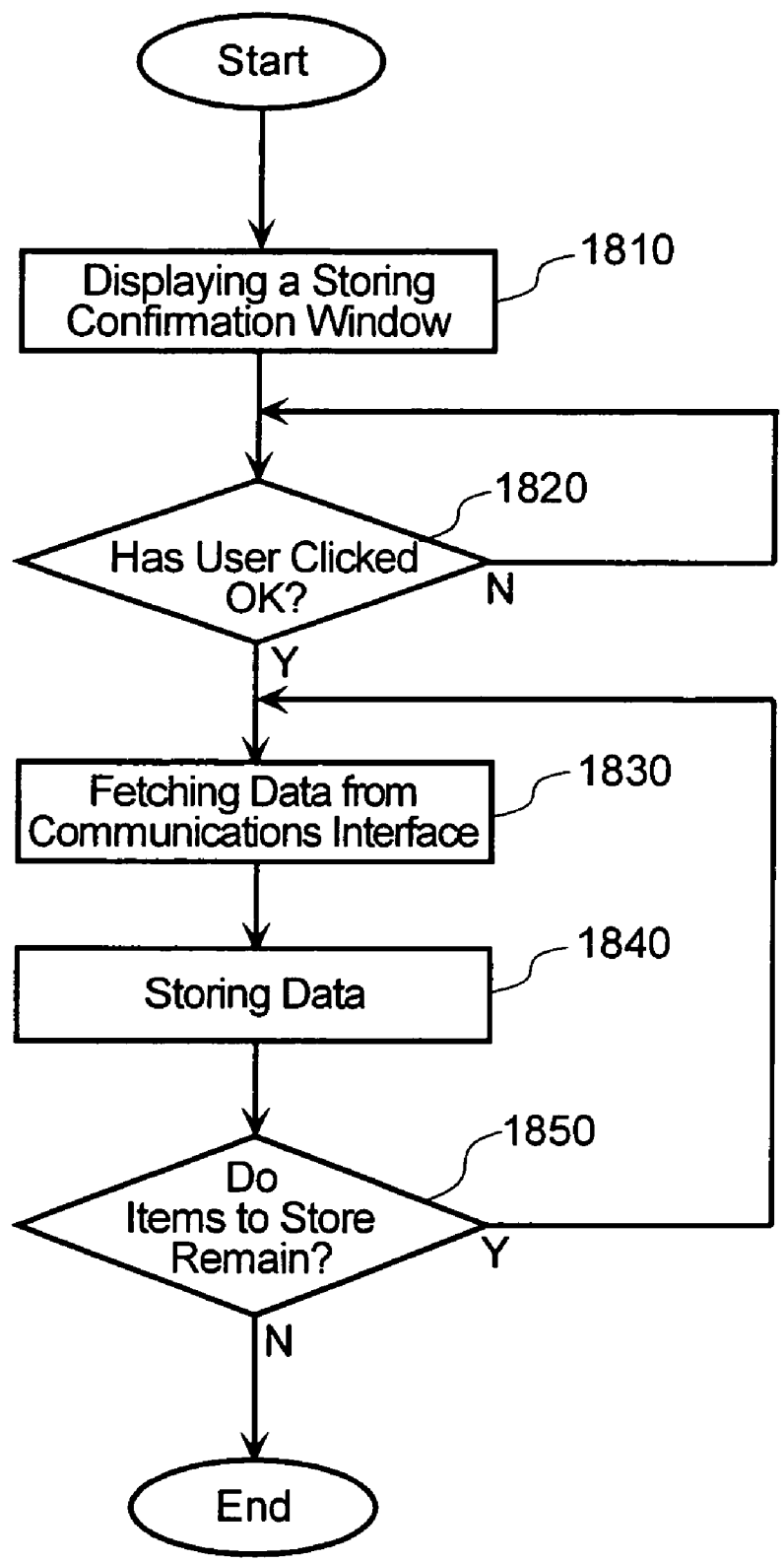
FIG. 18 is an exemplary flowchart illustrating the steps of a process of storing received information.

FIG. 18 is a flowchart illustrating the steps of the process of storing received information. First, a storing data confirmation prompt is displayed on the display 20 (step 1801); the prompt is illustrated in FIG. 19. Then, the control unit 50 checks whether the user has clicked OK (step 1820). When the user has clicked OK, the control unit fetches received data from the communications interface (step 1830). According to the data type, the control unit 50 stores the fetched data into one of the databases whose structures are illustrated in FIGS. 15, 16, and 17, respectively, existing in the storage in order from the first field. The control unit 50 checks whether items to store remain (step 1850) and fetches data from the communications interface until no data to store has remained and repeatedly stores the fetched data into the memory. By carrying out this process, received information can be stored into any database retained in the storage device 30.

As explained above, in the present preferred embodiment, by selecting information items out of entered personal and schedule information, tagging the selected items with one of the level designators of business use, private use, and the like, and having the items stored, the information specifics can easily be altered, according to the transmission situation and the destination when the information is transmitted.

While, in the above-described embodiment, storing information such as personal information, selecting items to transmit, and transmitting the items of information to another terminal are performed on the portable information terminal, these operations may be performed by a service provider such as the operator center on behalf of the terminal user.

Figure 20:
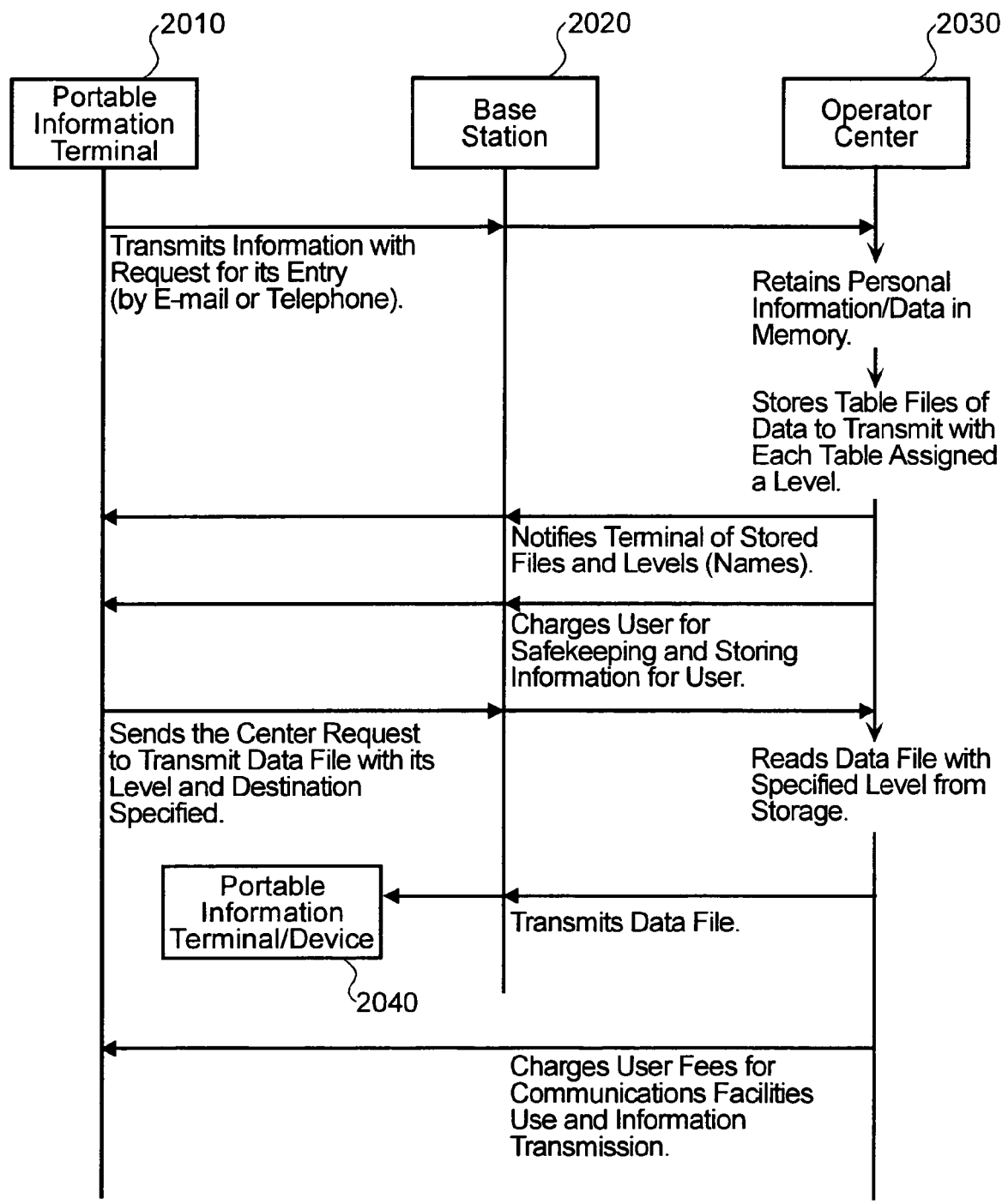
FIG. 20 is an exemplary diagram for explaining an information transmitting system according to a preferred embodiment of the present invention.

As illustrated in FIG. 20, first, the user makes the portable information terminal 2010 transmit data such as personal information by e-mail or the like to the operator center 2030. The operator center 2030 writes the received data into storage. Alternatively, the operator center 2030 files data such as personal information provided by the user by telephone and writes the data into storage as described above. The operator center 2030 selects items to transmit out of the data items that have been arranged into tables, according to predetermined business and private data table formats and retained in the storage, assign a designator (level) to each table, and stores table files as data to transmit. User-specified items to select if received are reflected in the above table files and the files are stored. The operator center 2030 sends the name of the stored table files of data to transmit to the portable information terminal 2010 and charges the user for safekeeping and storing information on behalf of the user.

When the user requests the operator center to transmit information to another portable information terminal or device 2040, the user makes the portable information terminal 2010 notify the operator center 2030 of the name (level) of a desired file of data to transmit and destination. The operator center 2030 reads the data file with the specified level from the storage, according to the designator, and transmit the data file to the above receiving portable information center 2040 via a base station 2020. Each time having executed data transmission by request from the user, the operator center 2030 charges the user the fees for communication and information transmission.

According to this preferred embodiment, personal information and the name of the table files of data to transmit, created from the above information, are stored into the storage of the operator center 2030. Thus, even if the capacity of the storage of the portable information terminal 2010 is very small, the information specifics to transmit can easily be altered, according to the transmission situation and the destination, when the information is transmitted. Even if the user has lost his or her portable information terminal or buys a new one, it is not necessary to enter personal and schedule information again and usability can be enhanced.

The operations described in the foregoing preferred embodiment such as writing personal information, selecting items to transmit with a name and storing them, and transmitting information are implemented by the program stored in the storage device 30. This program may be either installed beforehand when the user has purchased the portable information terminal or installed by the user after its purchase. When installing the program after the purchase of the portable information terminal, the user makes terminal gain access to a server on which the above program for controlling the terminal is stored, download the program, and store it into the storage device 30. When this download takes place, the server may charge the user for providing the program.

According to the present invention, a portable information terminal and information transmitting method making it possible to easily transmit a plurality of kinds of information can be provided.

While it has been shown and described several embodiments in accordance with the invention, it should be understood that disclosed embodiments are susceptible of changes and modifications without departing from the scope of the invention. Therefore, it is not intend to be bound by the details shown and describes herein but intends to cover all such changes and modifications that fall within the scope of the appended claims.

We claim:

1. A portable information terminal comprising:
   a memory which stores a plurality of information, each of which belongs to one of a plurality of categories;
   a category selector which selects one or more categories for a transmission data from the plurality of categories;
   a distance selector which selects a distance over which the transmission data including information belonged to the selected one or more categories is transmitted;
   a register which registers the selected one or more categories associated with the distance selected by the distance selector; and
   a transmitter which transmits the transmission data including information belonged to the selected one or more categories at a transmission power based on the selected distance.

2. The portable information terminal according to claim 1, further comprising a display,
   wherein the category selector allows a user of the portable information terminal to select the one or more categories via a graphical interface displayed on the display.

3. The portable information terminal according to claim 1, further comprising a display,
   wherein the category selector allows a user of the portable information terminal to select the one or more categories using a table format displayed on the display, the table format including the plurality of categories and check boxes.

4. An information transmission control method using in a portable information terminal, the method comprising the steps of:
   storing, in the portable information terminal, a plurality of information, each of which belongs to one of a plurality of categories;
   selecting, using the portable information terminal, one or more categories for a transmission data from the plurality of categories;

selecting, using the portable information terminal, a distance over which the transmission data including information belonged to the selected one or more categories is transmitted;

registering, using the portable information terminal, the selected one or more categories associated with the selected distance; and transmitting, via an antenna of the portable information terminal, the transmission data including information belonged to the selected one or more categories at a transmission power based on the selected distance.

* * * * *